(12) United States Patent
Hambitzer et al.

(10) Patent No.: US 6,194,072 B1
(45) Date of Patent: Feb. 27, 2001

(54) ELECTROCHROMIC UNIT

(75) Inventors: Günther Hambitzer; Ulrike Dörflinger, both of Pfinztal; Ingo Stassen, Karlsruhe; Clemens Schmidt, Weingarten, all of (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 08/868,069

(22) Filed: Jun. 3, 1997

(30) Foreign Application Priority Data

Jun. 5, 1996 (DE) .............................. 196 22 600

(51) Int. Cl.$^7$ ........................................ G02F 1/15
(52) U.S. Cl. ................ 428/411.1; 428/131; 428/457; 428/901; 428/918; 428/917; 428/912.2; 359/265; 359/267; 359/269; 359/270; 359/271; 359/266; 359/274
(58) Field of Search ................ 428/131, 411.1, 428/457, 901, 918, 917, 912.2; 359/265, 267, 269, 270, 271, 266, 274

(56) References Cited

U.S. PATENT DOCUMENTS

| | | | |
|---|---|---|---|
| 3,844,636 | * 10/1974 | Maricle | 350/160 |
| 4,116,545 | 9/1978 | Reddy | 350/357 |
| 4,215,917 | * 8/1980 | Giglia et al. | 359/272 |
| 4,465,339 | 8/1984 | Bauche et al. | 350/357 |
| 4,749,260 | * 6/1988 | Yang et al. | 350/357 |
| 5,446,577 | * 8/1995 | Bennett et al. | 359/273 |
| 5,521,745 | * 5/1996 | Silver et al. | 350/357 |

FOREIGN PATENT DOCUMENTS

| | | |
|---|---|---|
| 0027855 | 5/1981 | (EP) . |
| 0028147 | 5/1981 | (EP) . |
| 0495303 | 7/1992 | (EP) . |
| 62-144145 | 6/1987 | (JP) . |
| 0281032 | 3/1990 | (JP) . |
| 9416356 | 7/1994 | (WO) . |

OTHER PUBLICATIONS

Heinische, C. Elektrochrome Fenster ein Schritt weiter in:Physik in Unserer Zeir 1993, 24 Jahrg, Nr. 6, S 257.

P. Schlotter Laminated electrochromic device for smart windows, Spie, vol. 2255/351–362.

* cited by examiner

*Primary Examiner*—William P. Watkins, III
(74) *Attorney, Agent, or Firm*—Antonelli, Terry, Stout & Kraus, LLP.

(57) ABSTRACT

An electrochromic unit (1) having an electrochemical cell with at least two electrodes (3, 4) applied to a carrier, an electrolyte (2) located between the electrodes (3, 4) and an electrochromic material (7), such as an electrochromic polymer, applied to one of the electrodes (3), is characterized by a proton exchange membrane (2) as a solid electrolyte and carrier for the bilaterally applied electrodes (3, 4), the electrochromic material (7) being positioned on the side of the electrode (3) carrying it remote from the membrane (2).

12 Claims, 2 Drawing Sheets

ELECTROCHROMIC UNIT

FIELD OF THE INVENTION

The invention relates to an electrochromic unit having an electrochemical cell with at least two electrodes, an ion conductor located between the electrodes and an electrochromic material.

BACKGROUND OF THE INVENTION

The hitherto known electrochromic units are electrochromic windows with transparent systems, which can be coloured in any desired manner. They are intended to absorb incident electromagnetic radiation, preferably visible tight. They are e.g. used in the car sector, where they are employed in the form of dimmable rear-view mirrors. For this purpose the electrochromic windows have an electrochromic cell with two electrodes and an electrolyte located between them, the electrodes being in each case applied to a suitable carrier and at least one carrier and one electrode are transparent. The electrochromic material is applied to the transparent electrode between the electrode and the electrolyte. Glass normally forms the transparent carrier and is then coated with the transparent electrode. The electrochromic material is usually in the form of transition metal oxides, e.g. tungsten oxide. Such a window with tungsten oxide as the inorganic, electrochromic material is used in window construction, where the tungsten oxide is introduced between two window panes and is used for darkening the entire pane for reducing insolation. The electrolyte is always an ion conductor and is located between the electrochromic material, e.g. tungsten oxide, and the second electrode positioned parallel to the first. As a result of this arrangement (transparent carrier/first, transport electrode/electrochromic material/electrolyte/second electrode/carrier), it is ensured that the electrolyte and electrochromic material are always in intimate contact with one another, so that in the case of a current flow a material exchange can take place between them. As a result of an applied voltage, charges are injected into the electrochromic material, which gives rise to the desired colour change. However, it is disadvantageous that several minutes are always needed for the colouring or decolourizing of the window.

Apart from metal oxides, electrically conductive polymers are used as electrochromic materials. Here again charges are injected into the polymer by a current flow between the electrodes and give rise to a colour change. The transparent electrode is usually constituted by indium tin oxide to which the electrochromic polymer is applied. As ion conductors acidic electrolytes are needed, which is followed by the second electrode, which is usually also transparent. However, each windows have an inadequate long-term stability, because the acidic electrolytes act corrosively with respect to the transparent electrode. With time the latter gradually loses its electrical conductivity, so that the electrochromic material can no longer be activated. The electrochromic window can consequently no longer fulfil its function over a period time.

The problem of the invention is to provide an electrochromic unit of the aforementioned type, in which there is no need for a transparent carrier or a transparent electrode and which in the case of rapid switching times is characterized by a high long-term stability.

SUMMARY OF THE INVENTION

According to the invention the set problem is solved by an electrochromic unit of the aforementioned type, which is characterized in that the ion conductor is a proton exchange membrane and is the carrier for electrodes bilaterally applied thereto, that the electrodes are metal electrodes and that the electrochromic material is located on the membrane-remote side of an electrode carrying it. This electrochromic unit according to the invention is characterized in that, compared with an electrochromic window, it has a completely novel construction, in which the electrochromic polymer is located outside the electrochromic cell of electrodes and proton exchange membrane. As the electrochromic material is flow on the outside, there is no need for a transparent carrier or electrodes. This novel electrochromic system is based on the proton exchange membrane, which serves both as a carrier for the electrodes or electrical contacts and as a solid ion conductor allowing a charge transfer between the two electrodes. There is also no need for a further, separate carrier for the electrodes, as in the prior art. As the electrodes no longer need be transparent, there is a considerable increase in the number of possible electrode materials. It is correspondingly possible to use electrodes with a higher corrosion resistance than is the case with the hitherto available transparent electrode materials, such as e.g. indium tin oxide. Correspondingly the novel electrochromic unit according to the invention has a high long-term stability.

In preferred manner, the proton exchange membrane is constructed in the form of a solid film or foil. Due to the fact that on the film are now applied the electrodes and on an electrode the electrochromic polymer, it is possible to create a flexible, pliable electrochromic system. This makes possible wider fields of application than was possible with the known electrochromic windows, which were rigid and inflexible due to the carrier materials. The proton exchange membrane preferably comprises a fluorine polymer, to whose side chains are applied sulphonic acid groups. Such a membrane is obtainable under the trade name Nafion. However, it is also possible to use a membrane of any other suitable material. The membrane layer thickness is max 100 $\mu$m and is preferably 10 $\mu$m thick or less.

The electrodes, which no longer need be transparent, are preferably made from metal, such as gold or platinum. These metals have a much higher corrosion resistance than the hitherto available transparent electrode materials and can be bilaterally applied to the proton exchange membrane in the form of electric contacts. The application of the electrodes or electric contacts to the ion-conducting layer or PEM preferably takes place by deposition from the gas phase. It is alternatively possible to electrically contact one side of the proton exchange membrane by simply pressing on a metal net or lattice or a metal-coated net. However, this alternative procedure is only possible for the counterelectrode. Through deposition from the gas phase it is now possible to apply the metal coating forming the electrodes in such a thin manner that the metal coating appears optically transparent, but still permits electrical conduction. It is in particular possible in this way to ensure that the metal electrode is continuously, areal electrically conductive, whilst being permeable for the protons migrating between the electrochromic polymer and membrane. Without such an ion migration, in this case a proton migration, between the solid electrolyte and the electrochromic polymer through the metal electrode no colour change would be possible. It has been found that the requirements concerning proton permeability, as well as the continuous, areal electrical conductivity are fulfilled by a metal electrode with a minimum thickness of a few nanometers. The electric contacts or metal coating preferably have a thickness of at least 5 nm. As a function of the intended use, this thickness can be varied up to 30 nm.

The electrochromic polymer is preferably polyaniline or a derivative thereof. In the ease of polyaniline or its derivatives as the electrochromic material, it is possible to obtain different colours and consequently a different absorption behaviour at different wavelengths, particularly in the visible range of the spectrum. With such materials a transparent state can also be achieved. With polyaniline derivatives the different colours, etc. are brought about by the side chains on the polymer skeleton, because they have different absorption characteristics as a function of the chemical structure of the side chains. Consequently the absorption wavelengths can be displaced. In addition, polyaniline and its derivatives have a high long-term stability and are far batter than other conductive polymers as regards durability and service life.

The application of the electrically conductive polymer to the metal-coated, proton exchange membrane takes place in preferred manner by deposition from a solution. The coating thickness can be varied as a function of the intended use and requirements, because the colour intensity is also determined by the thickness, which is generally 3 to 5 $\mu$m. Polymer deposition can e.g. take place by removing the solvent from the solution. It is also possible to use a solution which contains the monomer components of the polymer. By electrochemical oxidation the monomer is linked with the polymer and is deposited on the metal-coated membrane. In another preferred variant, the electrochromic polymer is applied to the coated membrane by evaporation. In this way a uniform coating is possible.

Instead of using a single electrochromic material, it is also possible to use several different electrochromic materials with different absorption characteristics in superimposed manner in a multilayer system. This makes it possible to cover a wider electromagnetic spectrum range than is possible with a separate, single-layer system. Thus, several colours are simultaneously covered by this multilayer structure.

The electrochromic membrane unit can be both opaque and transparent through corresponding choice of the electrochromic material, as well as the electrodes and their coating thicknesses. The thickness of the metal coating for electric contacting can be reduced to such an extent that it also appears transparent. This is the case with thicknesses of 5 to 7 nm and simultaneously an adequately high electrical conductivity is ensured. If the applied electrochromic polymer thickness is approximately 2 $\mu$m, the entire system, i.e. the complete electrochromic unit, bas a transparent character with a slight green colouring. The green is made more intense by dyeing action and when this is farther extended a deep blue colour can be obtained. Thus, this permits an optimum use for darkening window panes, particularly for reducing insolation in buildings or for dimming mirrors in motor vehicle construction.

It is also possible to structure the electrochromic unit, e.g. in the form of individual segments, which can be separately controlled. Thus, e.g. it is possible to produce an alphanumeric display, in the same way as the known LCD or LED-based display elements. However, large-area display elements can be obtained with the electrochromic unit, because it is also possible to manufacture larger surface areas (a few m$^2$).

Thus, an opaque or transparent electrochromic membrane system or unit is provided, whose colour can be modified as desired, in that the system is coloured by a short-duration current flow and is decolourized again by a current flow in the opposite direction and is thereby restored to the starting state. The colours are determined by the level of the voltage applied and therefore the current intensity. Besides a colour change and therefore an absorption of visible light, there is also a change to the absorption behaviour in the infrared range and that of radar radiation. Correspondingly such units or systems can be used in the camouflaging of objects, in that their contours are "blurred" by colour changes, so that it is not possible to identify them using known image recognition equipment.

The functionality of the electrochromic layer is maintained, although in the novel structure according to the invention it is no longer positioned between the two electrodes and no longer has an intimate contact with the electrolyte. The proton exchange membrane serving as the electrolyte and the electrochromic polymer are separated from one another by the metal layer serving as the electrode. However, as the metal layer can be applied so thinly that it can e.g. still appear optically transparent, but simultaneously retains its electrical conductivity, ions can migrate through the metal layer and simultaneously electron conduction in the layer still exists. Thus, the necessary material exchange between the membrane and the electrochromic polymer is provided without impairing the function of the electrode. Thus, by a positive current pulse charges can be injected into the electrochromic polymer and consequently the latter is charged. As a result of the charges in the polymer, the structure of the latter is changed. This structural change leads to a colour change, whose modifications and extent are dependent on the magnitude of the current pulse and therefore the number of injected charges, because as a result more pronounced structural changes can occur. Through a current pulse of the opposite direction the charge state of the electrochromic polymer is cancelled and the original colour restored. The current transfer between the two electrodes through the solid ion conductor takes place during the charging and discharging process by proton migration. As a result or a high mobility of the protons in the membrane and a low resistance, the operating voltage of the electrochromic unit can be reduced and the response time increased.

BRIEF DESCRIPTION OF THE DRAWINGS

Further advantages and features of the invention can be gathered from the following claims and description of an embodiment of the invention with reference to the attached drawings, wherein show:

DETAILED DESCRIPTION OF THE DRAWINGS

Figure 1:
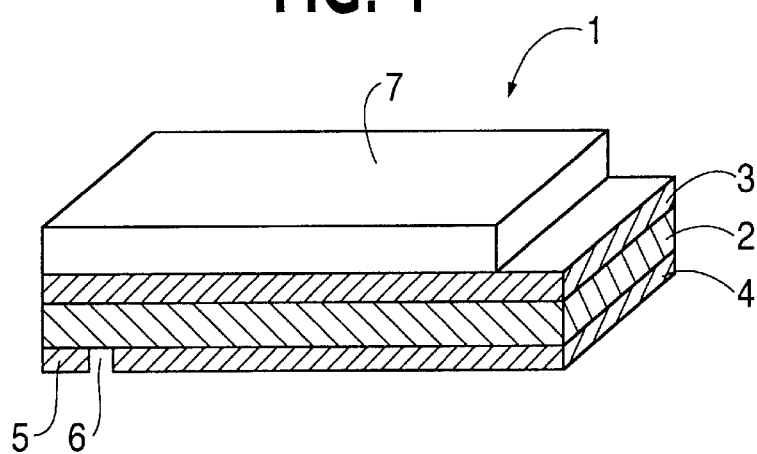
FIG. 1 A diagrammatic, perspective view of an electrochromic unit according to the invention.

The electrochromic unit 1 diagrammatically shown in FIG. 1 firstly has a proton exchange membrane (PEM) 2 in the form of a film, which is provided on its top and bottom with in each case electric contacts 3, 4, 5. These electric contacts or electrodes 3, 4 run parallel to one another and are applied to the membrane 2 in thin layer form. In the represented embodiment, a reference electrode 5 is separated from the electrode 4 by a gap 6 on the bottom of the proton exchange membrane 2. On the side remote from the membrane 2 on the upper electrode 3 is applied the electrochromic polymer 7. The thickness of the electrode 3 positioned between the electrochromic polymer 7 and the proton exchange membrane 2 is so chosen that the electrode is continuously and areally electrically conductive, but still has an adequate permeability for the protons. Thus, the thickness of the metal coating forming the electrode 3 is a few nanometers. The electrochromic polymer 7 can be a multilayer structure of different materials or a single-layer system.

Figure 2:
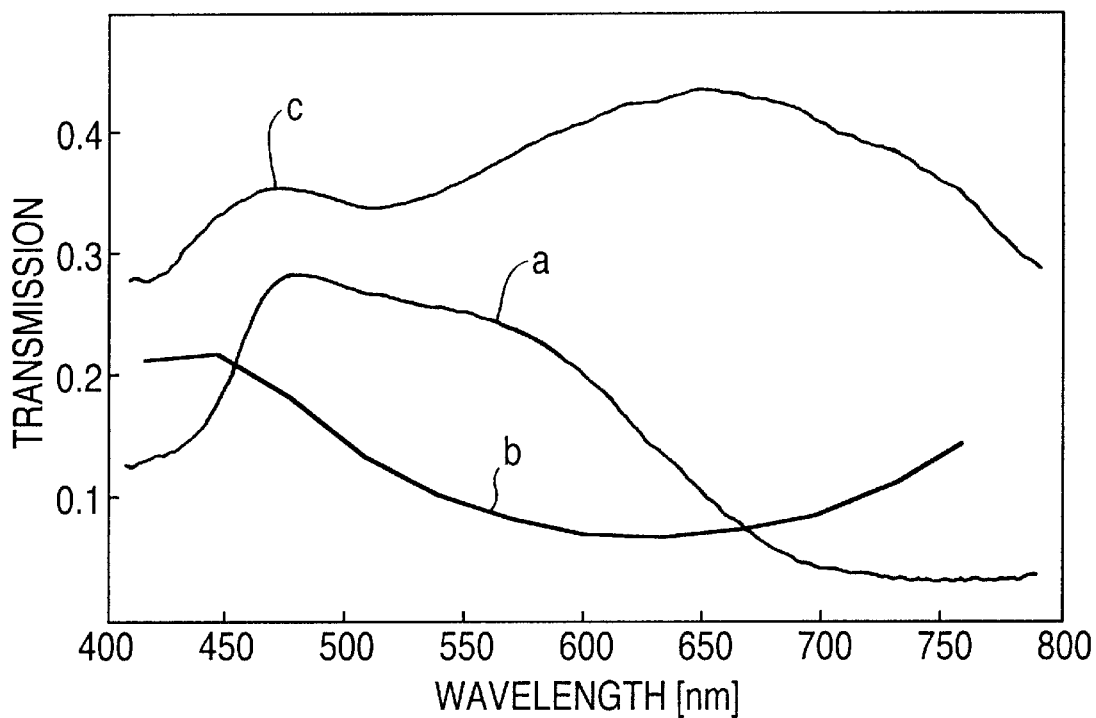
FIG. 2 A transmission spectrum for an electrochromic unit with different reduction and oxidation states of the electrochromic polymer.

FIG. 2 shows a transmission spectrum for polyaniline as the electrochromic material. The different graphs a, b and c represent the polyaniline in different oxidation and reduction states. As can be gathered from FIG. 2, polyaniline in the partly oxidized state between 475 and 575 nm has a transmission maximum, i.e. an absorption minimum. Through further oxidation there is a displacement of this absorption behaviour, so that in the fully oxidized state (graph b), the material acts in a strongly absorbing manner. By reduction, i.e. current reversal (graph c), the now reduced polyaniline acts in a "transparent" manner for the incident light. However, it has a high transmission over the entire wavelength range shown. This behaviour is also rendered visible to the outside for the observer of the electrochromic unit by the colour change to the electrochromic material.

Figure 3:
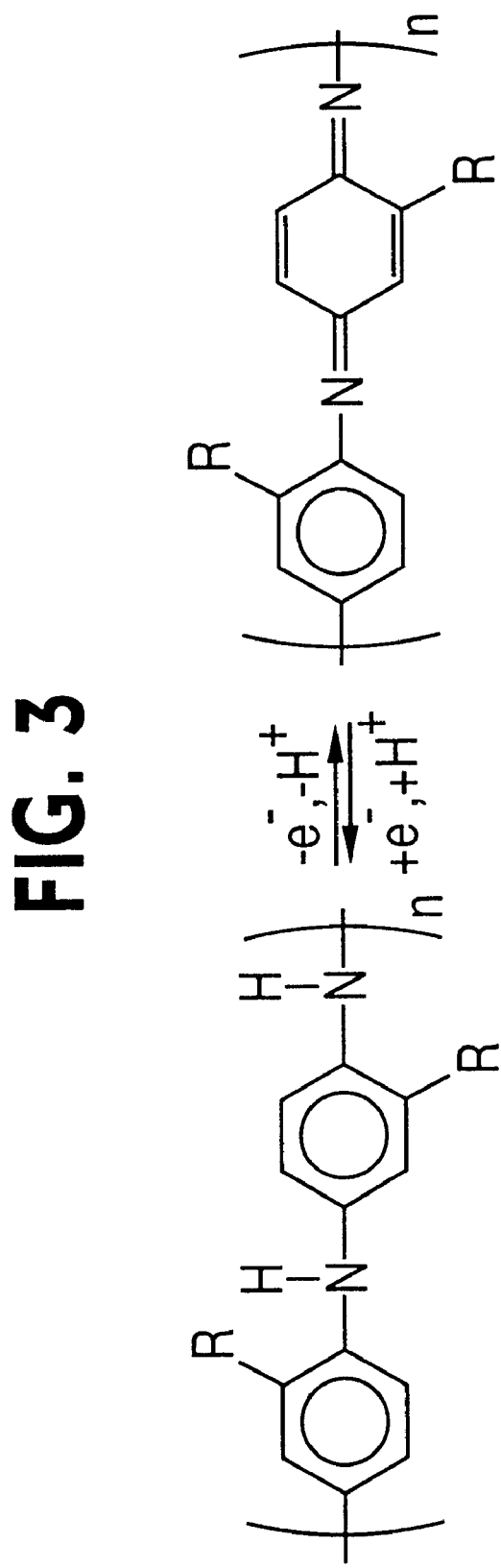
FIG. 3 The structural change of an electrochromic polymer on supplying or extracting protons and charges.

FIG. 3 shows the structural change of an electrochromic polymer (polyaniline) accompanied by charge supply and extraction. The represented polyaniline has in its left-hand structure, in which the radical R can stand for hydrogen H, alkyl, alkoxy, etc., has a transparent or yellow colouring. In this uncharged state (left-hand structure) the conjugate double bond system in the polyaniline is fully formed and absorbs electromagnetic radiation of a specific wavelength. By electron extraction, e.g. by an externally applied voltage, and therefore removal of hydrogen (splitting off of nitrogen N) from the polyaniline, the material colour changes to green or blue. As a result of electron extraction, positive charges are left on the polymer chain. The conjugate double bond system of the polyaniline having an aromatic character passes into the quinoid system (right-hand structure). The positive charge resulting from the hydrogen atom on the nitrogen can now migrate along the molecular chain. The quinoid system obtained in this way has different absorption characteristics and consequently appears in a different colour. If the material is now again supplied with electrons by current reversal, the hydrogen atom is again attached to the nitrogen and the electrochromic material acquires its initial colour. This reversible process can be repeated randomly frequently. As a function of the magnitude of the current pulse and therefore the number of injected charges, more or less hydrogen atoms can be split off from the nitrogen, so that the colour can further change and deepen.

What is claimed is:

1. An electrochromic unit consisting of an electrochemical cell, with at least two electrodes, an ion conductor positioned between the electrodes and an electrochromic material, characterized in that the ion conductor is a proton exchange membrane and said ion conductor is the carrier to which the electrodes are bilaterally applied, wherein the electrodes are metal electrodes, and wherein the electrochromic material is located on a side of an electrode carrying it remote from the ion conductor.

2. Unit according to claim 1, characterized in that the metal electrodes comprise gold.

3. Unit according to claim 1, characterized in that the metal electrodes comprise platinum.

4. Unit according to claim 1, characterized in that the electrodes are applied to the membrane by deposition from the gas phase.

5. Unit according to claim 1, characterized in that the electrochromic material comprises polyaniline.

6. Unit according to claim 1, characterized in that the electrochromic material comprises a polyaniline derivative.

7. Unit according to claim 1, characterized in that the electrochromic material is applied to the electrode by deposition from a solution.

8. Unit according to claim 1, characterized in that the electrochromic material is applied by deposition on the electrode (2).

9. Unit according to claim 1, characterized by a multilayer system of several, different electrochromic polymers as the electrochromic material.

10. Unit according to claim 1, wherein the electrode thickness is 5–30 nm.

11. Unit according to claim 1, wherein the electrode thickness is 5–7 nm.

12. Unit according to claim 5, wherein said polyaniline has a transparent or yellow coloring in its uncharged state in which the conjugate double bond system is fully formed and absorbs electromagnetic radiation, and wherein when a voltage is externally applied to said polyaniline, there is a removal of hydrogen from said polyaniline and a change of color to green or blue.

* * * * *